Feb. 23, 1971  M. J. KEDEL  3,565,473
HOLD-DOWN CLIP FOR TILES IN SUSPENDED CEILING STRUCTURE
Filed Oct. 8, 1968  2 Sheets-Sheet 1
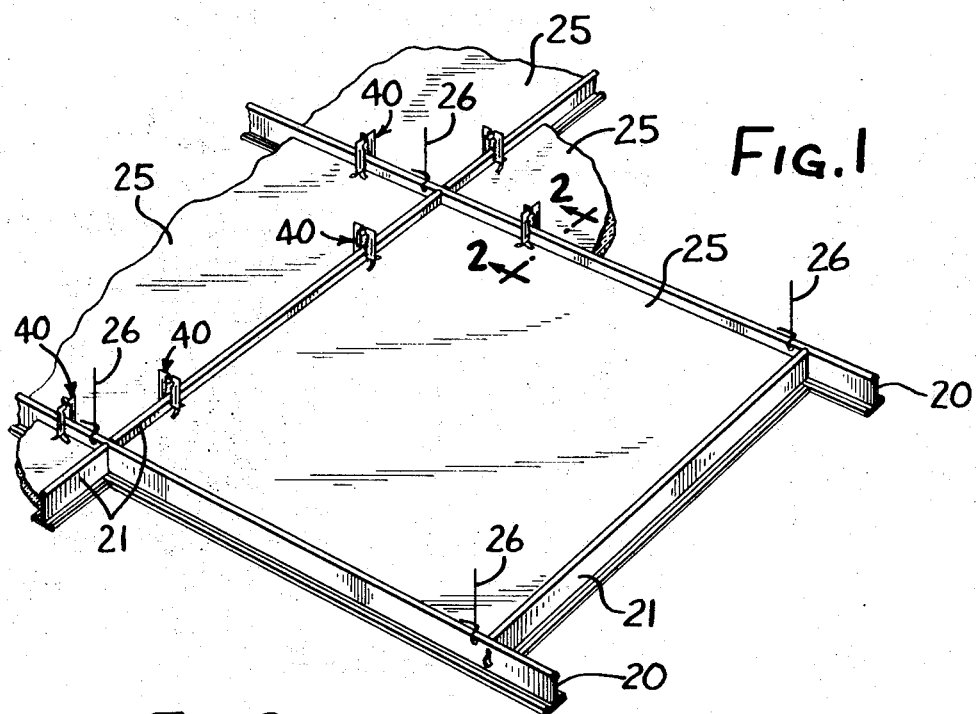
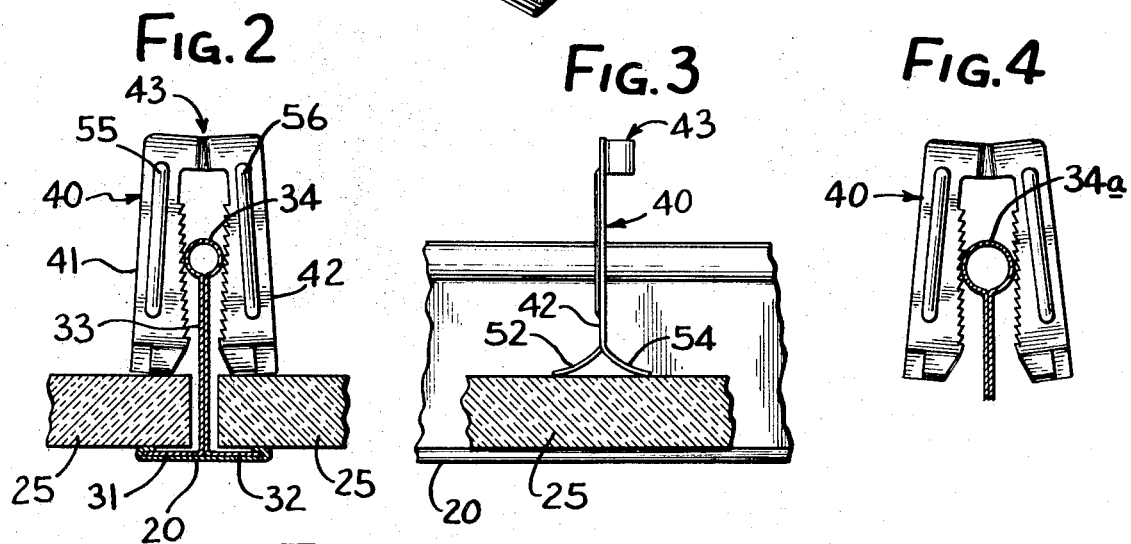
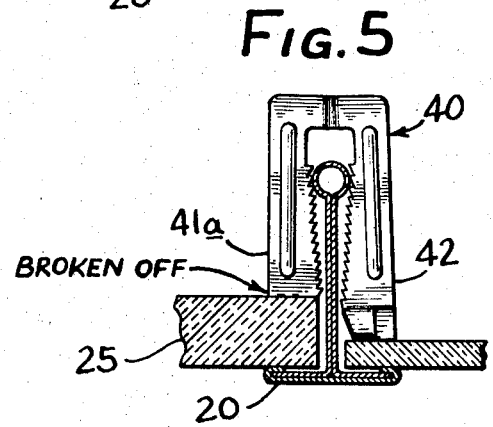
INVENTOR
MICHAEL J. KEDEL
by: Wolfe, Hubbard, Voit & Osann
ATTYS.

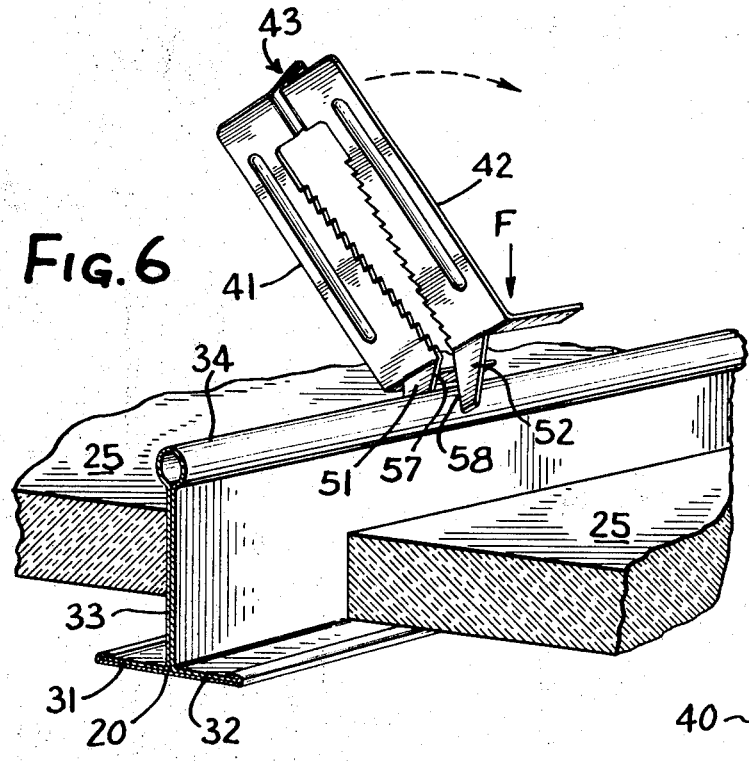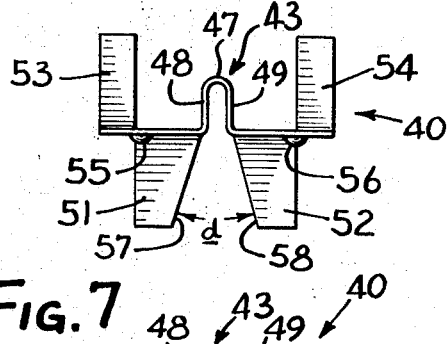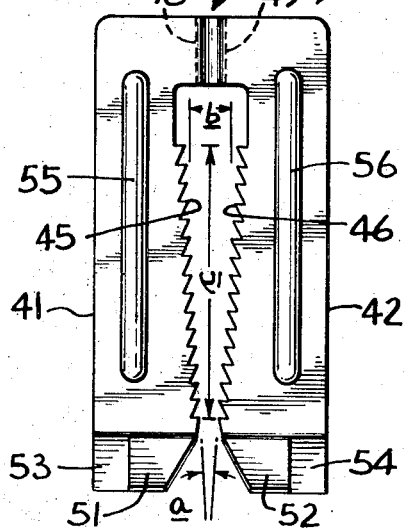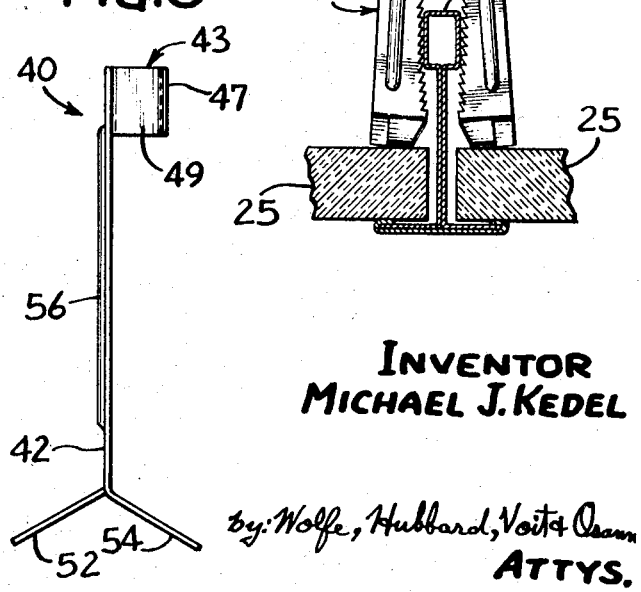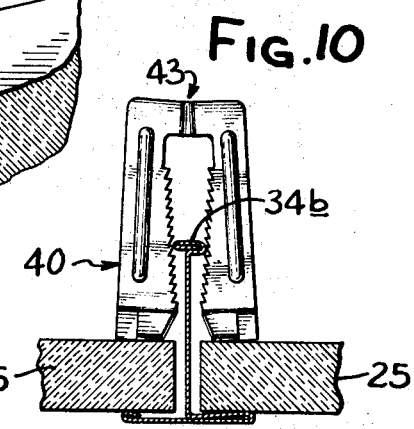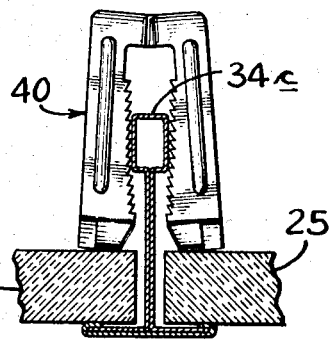

United States Patent Office 3,565,473
Patented Feb. 23, 1971

3,565,473
HOLD-DOWN CLIP FOR TILES IN SUSPENDED
CEILING STRUCTURE
Michael J. Kedel, Baltimore, Md., assignor to Eastern Products Corporation, Baltimore, Md., a corporation of Maryland
Filed Oct. 8, 1968, Ser. No. 765,792
Int. Cl. E04b 5/57
U.S. Cl. 287—189.35                                    7 Claims

ABSTRACT OF THE DISCLOSURE

A hold-down clip for engaging the rib or bulb of the supporting members in a suspended ceiling system to hold the ceiling tiles against dislodgement. The clip is of inverted U-shape having opposed, serrated inner edges for gripping the rib joined by a resilient bridge to develop the necessary gripping force. Resilient feet engage the edge portion of the adjacent tiles, adjacent feet being divergent to facilitate installation.

---

It is an object of the invention to provide a hold-down clip for a suspended ceiling construction which may be used more or less universally, wherever necessary to keep ceiling tiles flat against their supporting surfaces and which prevents dislodgement upon sudden change in air pressure, due to slamming of a door or the like, or upon impact of a stream of water from a fire hose.

It is another and more specific object to provide a hold-down clip which is not only capable of accommodating itself to a wide range of types, sizes and heights of ribs, but which grips the sides of the rib positively, biting into the metal of which the rib is formed. In this connection it is an object to provide a hold-down clip which provides secure clamping action but which may be installed quickly wherever needed by easy manual manipulation and which may just as readily be removed should removal become necessary.

It is an object to provide a hold-down clip which holds adjacent tiles in a firmly bottomed position in spite of warping and in spite of minor variations in thickness and which may be used, with minor modification, to hold down adjacent tiles having radically different thickness.

It is a general object to provide a hold-down clip which is simple, and inexpensive for use in quantity by installers of various designs of ceiling support systems, regardless of source or manufacturer.

Other objects and advantages of the invention will become apparent upon reading the attached detailed description and upon reference to the drawings in which:

FIG. 1 is a perspective view of a portion of a typical suspended ceiling system to which the hold-down clip is applicable;

FIG. 2 is an elevational view of one of the clips in working position looking along the line 2—2 in FIG. 1;

FIG. 3 is a side view of the assembly shown in FIG. 2;

FIG. 4 is a fragmentary view similar to FIG. 2 but showing the clip gripping a rib of larger diameter;

FIG. 5 is another view similar to FIG. 2 but showing one of the legs foreshortened to accommodate adjacent tiles of radically different thickness;

FIG. 6 is a fragmentary perspective showing the combined pressing and rocking of a hold-down clip into working position;

FIGS. 7, 8 and 9 are front elevation, side elevation and top views of a hold-down clip in its initial or relaxed state; and FIGS. 10 and 11 are similar to FIG. 2 but show the clip in engagement with ribs of noncircular cross section.

While the invention has been described in connection with a preferred embodiment, it will be understood that I do not intend to be limited to the particular embodiment shown but intend, on the contrary, to cover the various alternative and equivalent constructions included within the spirit and scope of the appended claims.

Turning to FIG. 1 there is shown a portion of a suspended ceiling system having longitudinal supporting members 20 of inverted T cross section with cross members 21, also of inverted T configuration, extending therebetween in abutting relation, the members together forming receptacles for receiving rectangular ceiling tiles 25 which are preferably of fire-resisting material. The assembly is suspended from the ceiling of the room by wires 26 which extend through openings formed in the members 20, with the ends thereof being bent over as shown to establish an even suspension height.

A typical supporting member or beam 20, shown in cross section in FIG. 2, is conveniently roll-formed from a strip, or strips, of metal to provide oppositely directed horizontal flanges, 31, 32, a vertical web 33 and a reinforcing rib or bulb 34 extending along the top edge.

In accordance with the present invention a hold-down clip is provided which has a body of inverted U shape having a pair of legs arranged in a plane, the opposed inner edges of the legs having serrations formed thereon for engaging the opposite sides of a rib, and with the legs being joined by resilient bridge for applying mutually inward force at the serrations when the legs are spread apart by the rib upon pressing the clip into a working position in which feet at the ends of the legs engage edge portions of adjacent ceiling tiles.

Turning to the drawings and particularly to FIGS. 7, 8 and 9, a typical clip 40, fabricated of flat spring metal stock, has legs 41, 42 joined by a resilient bridge 43. The opposed inner edges of the legs are serrated as indicated at 45, 46. The serrations are preferably of saw tooth configuration with the points oriented inwardly and upwardly to enable the clip to be easily pressed into a working position in which the points dig in to anchor the clip in the face of a dislodging force applied upwardly anywhere on the presented surface of the tile. In order to develop the necessary gripping force while maintaining the legs in a coplanar relationship, and for accommodating a relatively large angular "spread" between the legs, the resilient bridge 43 is preferably in the form of a laterally extending, integral loop of spring metal 47. The loop provides parallel sidewalls 48, 49 which are capable of deforming into an angled position relative to one another when the legs are spread but which have a sufficiently high spring rate so that relatively high level clamping forces may be developed without concentration of stress at localized points which might result in breakage.

For the purpose of engaging the edge portions of the adjacent tiles, sprung feet are provided in the form of integral tabs at the ends of the legs 41, 42. A first, or inner, pair of feet are indicated at 51, 52. A second, or outer, pair of feet 53, 54 extend in the opposite direction, (see especially FIG. 9). Preferably, the feet extend outwardly and downwardly at an angle, yielding when brought into engagement with the tile thus insuring that both of the adjacent tiles are firmly clamped to their respective flanges. The resilience of the feet makes it unnecessary for the installer to "balance" the clip and insures that both of the adjacent tiles will be more or less equally acted upon even in the face of variations in tile thickness. The resilient feet present sufficient area so that they do not tend to "dig in" to tiles of soft or porous material.

To longitudinally rigidify the legs of the clip even when using spring stock of limited thickness, the legs are preferably each provided with a longitudinal embossment as indicated at 55, 56.

It is one of the features of the construction that the serrated edges are not parallel to one another when the clip is in its relaxed state but are, on the contrary, convergently arranged at a shallow angle indicated at $a$ in the drawings and which may, in a practical case, range between 0° and 7°. The angling tends to make the gripping force more constant for ribs of varying height. The root clearance, indicated at $b$, in FIG. 7, is preferably slightly less than the expected maximum diameter of ribs with which the hold-down clip may be employed. In a practical case, the dimension $b$ may be within the range of 0 to ¼ inch. The serration length corresponding thereto, indicated at $c$ in the drawings, may, in a practical case, range between $27/32$ and $29/32$ inch.

It is one of the useful features of the present construction that the inner pair of resilient feet 51, 52 have inner edges 57, 58 which are divergent to facilitate spreading of the clip with combined rocking and downward force as the clip is installed. Thus, as shown in FIG. 6, the feet 51, 52 are placed instraddling position over the rib 34. Upon applying a force, indicated at F, with the fingertips, the divergent edges 57, 58 are cammed apart by the rib 34 so that the rib may be entered into the region of the serrations. The resulting spreading of the legs 41, 42 while the legs continue to be coplanar, causes progressive deformation in the resilient bridge 43, producing a clamping force at the region of engagement of the serrations which may, in a practical case, lie between 1 lb. and 4 lbs. This is adequate to produce per unit pressures at the edges of the teeth sufficient to insure that the teeth will bite into the surface or the surface finish of the supporting member 20, and particularly the rib portion 34 thereof, is made. After the clip has been entered onto the rib by the spreading of the legs, the clip is swung into a straight up and down position and downward force is applied to seat the feet 51-54 snugly against the edge portions of the adjacent tiles. Installation takes more time to recount than to accomplish, and an experienced operator can install one of the clips in fully seated position within a second or two. The fact that the legs 51, 53 and 52, 54 extend in opposite directions from the plane of the clip insures that the clip will naturally tend to assume, and remain in, a perpendicular position with respect to the engaged tiles.

It is particularly to be noted that the clip may be used practically universally for all supporting members of inverted T configuration regardless of the size, shape or height of the reinforcing rib 34. Thus, the same clip may be used with a supporting member having a somewhat larger diameter or rib as indicated at 34a in FIG. 4. Nor is the clip limited to use with ribs of circular outline. The serrations are equally effective in engaging thin concentrated ribs as indicated at 34b in FIG. 10, or ribs of hollow rectangular configuration as indicated at 34c in FIG. 11. The manipulation required to install the clips in place is the same regardless of the shape. Nor is any judgment required on the part of the operator by reason of the rib height or tile thickness. The clip is, in any event, simply pressed into its seated position until resistance is felt, indicating that the resilient feet 51–54 have been engaged and flexed so that the tiles are firmly and resiliently clamped. Normal installing pressure is adequate to overcome any warping or bowing in individual tiles, so that the tiles form a snug and neat appearing joint all along the region of contact with the supporting flange.

The number of hold-down clips employed is not critical and it is an easy matter for the operator to judge the number and location of the clips to be used. Each of the clips holds down the edges of two adjacent tiles so that in a complete system hold-down may be achieved overall by using as few as two of the clips per tile. Where the tiles are large, up to several feet in edge dimension, it will be apparent that a number of clips may be spaced along a single edge as shown in FIG. 1.

The tiles, installed with hold-down clips, are held against the possibility of jumping out of place due to the sudden changes in pressure, resulting, for example, from the slamming of a door, which may occur where gravity alone is relied upon, particularly in rooms having inadequate venting. Of more serious import is the fact that tiles installed with the present hold-down clips form a more effective fire barrier, tending to remain securely in place even when subjected to the blast of water from a fire hose.

While the invention has been described in connection with tiles having the same nominal thickness, it is one of the features of the present clip that it may, with only minor modification, be accommodated to adjacent tiles of radically different thickness as, for example, where a thin sheet of translucent material adjoins a thicker tile which is non-translucent. In such event, and assuming that the clip has been hardened to the point of brittleness, one of the legs, indicated at 41a in FIG. 5, can be simply "snapped" off at the appropriate level by a pair of pliers or the like. The snapped leg need not be accurately dimensioned since the resilience of the feet on the opposite side provide sufficient "give" to insure that both legs will make contact with their respective tiles. In a practical case the clip may be made of spring steel stock of .015 inch thickness hardened to within the range of 42 to 48 on the Rockwell C scale.

In the event that it becomes necessary, for any reason, to remove one of the clips, this can be easily accomplished, and the bite of the serrations released, simply by twisting the upper end of the clip so that the legs are moved out of their coplanar relation, following which the clip may be withdrawn upwardly with very little force.

Experience has shown that the hold-down clip described above may be used with all of the various suspension ceiling systems currently on the market, and characterized by inverted T cross section, making it unnecessary for the clips to be used or stocked in a variety of sizes. The fact that the same clip may be used more or less universally enables economy of manufacture-distribution so that the clips may be made available at low cost to the trade in lieu of the specialized or more elaborate clips which have been used in the past. The term "feet" as used herein refers to the terminating surfaces or edges on the respective legs.

I claim as my invention:

1. A hold-down clip for use with a suspended ceiling construction employing tile-supporting members of inverted T cross section having a rib along the upper edge comprising, in combination, a clip body of inverted U shape having a pair of legs lying in a plane, feet at the end of said legs, the opposed inner edges of the legs having clip-retaining serrations formed thereon for engaging the opposite sides of the rib, the legs being connected by a resilient bridge for applying mutually inward force at the serrations when the legs are spread apart by the rib upon pressing the clip into a working position in which the feet are bottomed against the edge portions of respective tiles, the resilient bridge being in the form of a loop of metal which is integral with the legs and which extends laterally out of the plane of the body of the clip.

2. A hold-down clip for use with a suspended ceiling construction employing tile-supporting members of inverted T cross section having a rib along the upper edge comprising, in combination, a clip body of inverted U shape having a pair of legs lying in a plane, feet at the ends of said legs, the opposed inner edges of the legs having clip-retaining serrations formed thereon for engaging the opposite sides of the rib, the legs being connected by a resilient bridge for applying mutually inward force at the serrations when the legs are spread apart by the rib upon pressing the clip into working position in which the feet are bottomed against the edge portions of respective tiles, the legs being provided with feet extending in opposite directions from the plane of the legs.

3. A hold-down clip for use with a suspended ceiling construction employing tile-supporting members of inverted T cross section having a rib along the upper edge comprising, in combination, a clip body of inverted U shape having a pair of legs lying in a plane, feet at the ends of said legs, the opposed inner edges of the legs having clip-retaining serrations formed thereon for engaging the opposite sides of the rib, the legs being connected by a resilient bridge for applying mutually inward force at the serrations when the legs are spread apart by the rib upon pressing the clip into a working position in which the feet are bottomed against the edge portions of respective tiles, each leg being provided with a pair of spring feet extending outwardly and downwardly in opposite directions from the plane of the leg.

4. A hold-down clip for use with a suspended ceiling construction employing tile-supporting members of inverted T cross section having a rib along the upper edge comprising, in combination, a clip body of inverted U shape having a pair of legs lying in a plane, feet at the ends of said legs, the opposed inner edges of the legs having clip-retaining serrations formed thereon for engaging the opposite sides of the rib, the legs being connected by a resilient bridge for applying mutually inward force at the serrations when the legs are spread apart by the rib upon pressing the clip into a working position in which the feet are bottomed against the edge portions of respective tiles, the clip being integrally formed of a blank of thin spring stock hardened to the point of brittleness so that one of the legs may be snapped off at a predetermined length for accommodating adjacent ceiling tiles having a wide disparity of thickness.

5. A one-piece hold-down clip for use with a suspended ceiling construction employing tile-supporting members of inverted T cross section having a rib along the upper edge comprising, in combination, a clip body of inverted U shape having a pair of legs lying in a plane, the tips of the legs being split and bent in opposite directions to form hold-down feet, the opposed inner edges of the legs having sharp clip-retaining serrations formed thereon for engaging the opposite sides of the rib, the clip having an integral bridge interconnecting the upper ends of the legs, the bridge consisting of a loop of spring metal bent out of the plane of the clip for accommodating spreading movement of the legs under stress while maintaining the legs in coplanar relationship.

6. A hold-down clip for use with a suspended ceiling construction employing tile-supporting members of inverted T cross section having a rib along the upper edge comprising, in combination, a clip body of inverted U shape having a pair of legs lying in a plane perpendicular to the engaged rib, feet at the ends of said legs, the opposed inner edges of the legs each having a series of inwardly-facing clip-retaining serrations formed thereon for engaging the opposite sides of the rib, the legs being remotely interconnected by a resilient bridge extending laterally out of the plane of the body of the clip for applying mutually inward force at the serrations when the legs are anglingly spread apart by the rib upon pressing the clip into a working position in which the feet are bottomed against the edge portions of respective tiles, the serrations extending from the region of the bridge to the feet, the inner edges of the legs being convergent from the bridge to the feet in the normal unstressed state so that a more nearly constant gripping force is applied to ribs of similar thickness but different height.

7. The combination as claimed in claim 6 in which the ends of the legs terminate in tabs which are bent out of the plan of the clip in the same direction to form feet and in which the opposed inner edges of the tabs are convergently formed being more widely spaced at the tips thereof so that when the tabs engage the opposite sides of the rib the legs are wedged apart for entry of the rib between the convergent serrated edges of the clip.

References Cited

UNITED STATES PATENTS

| | | | |
|---|---|---|---|
| 1,793,127 | 2/1931 | Osius | 52—495 |
| 1,816,556 | 7/1931 | White | 52—489 |
| 2,251,723 | 8/1941 | Tinnerman | 85—36 |
| 2,318,640 | 5/1943 | Simmonds | 85—36 |
| 2,574,107 | 11/1951 | Joy | 85—36 |
| 2,923,385 | 2/1960 | Tinnerman | 85—36 |
| 3,263,388 | 8/1966 | Bogert | 52—495 |

FOREIGN PATENTS

| | | | |
|---|---|---|---|
| 573,581 | 11/1945 | Great Britain | 287—189.35 |
| 626,554 | 7/1949 | Great Britain | 52—484 |
| 629,843 | 9/1949 | Great Britain | 287—189.35 |
| 1,239,731 | 7/1960 | France | 52—495 |

MARION PARSONS, Jr., Primary Examiner

U.S. Cl. X.R.

52—484, 489, 495, 498; 85—36